Figure 1:
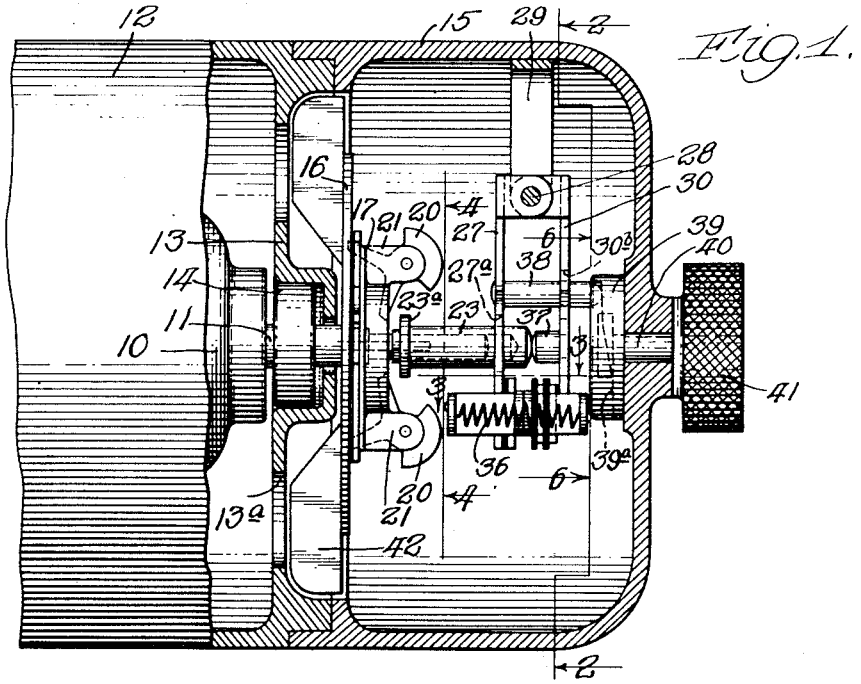

Sept. 25, 1951  C. H. SPARKLIN  2,568,774
SPEED GOVERNOR FOR MOTORS

Filed Dec. 16, 1947  2 Sheets-Sheet 1

Inventor:
Charles H. Sparklin,
By Christy, Schroeder, Herman & Halgren,
Attys.

Sept. 25, 1951   C. H. SPARKLIN   2,568,774
SPEED GOVERNOR FOR MOTORS
Filed Dec. 16, 1947   2 Sheets-Sheet 2
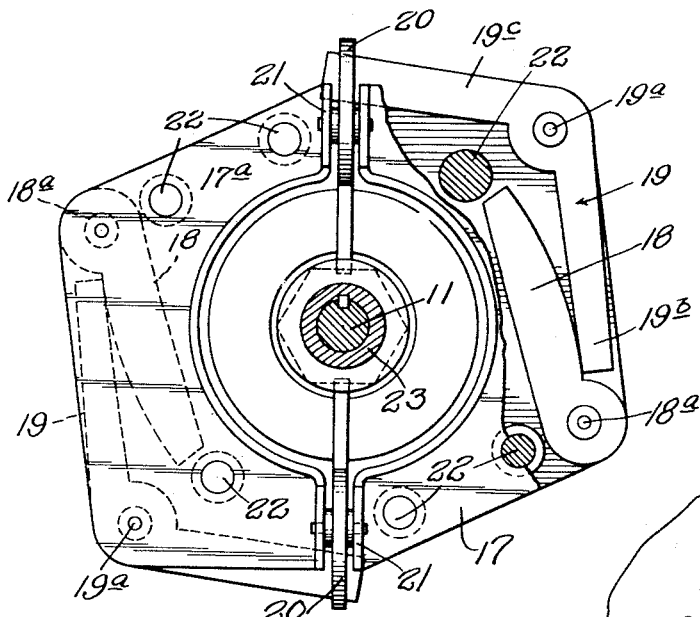
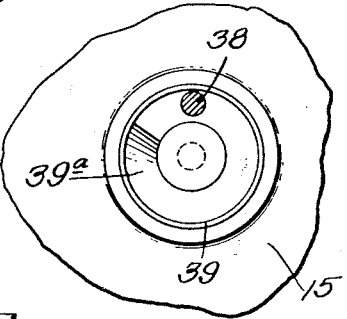
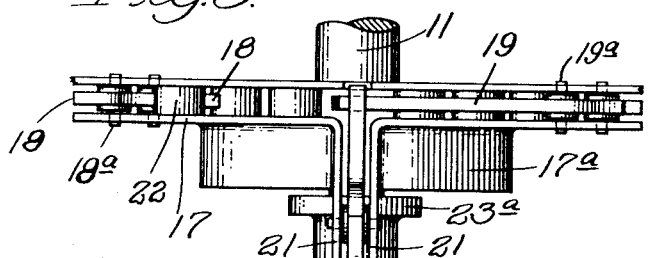
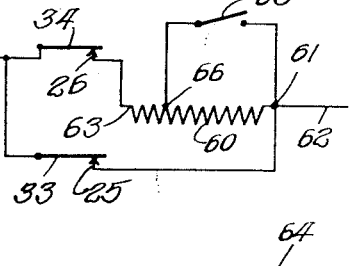
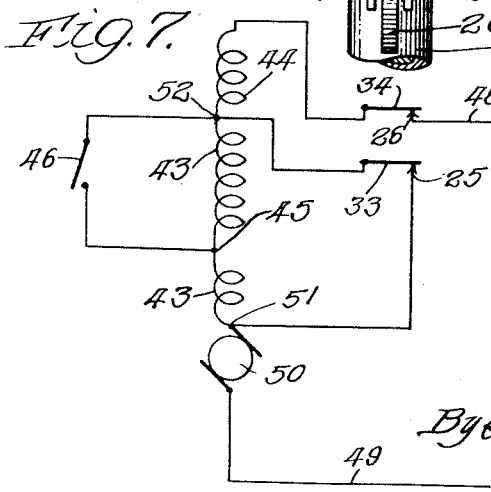
Inventor
Charles H. Sparklin,
By Christy, Schroeder, Merriam & Hoffman
Attys.

Patented Sept. 25, 1951

2,568,774

UNITED STATES PATENT OFFICE 2,568,774

SPEED GOVERNOR FOR MOTORS

Charles H. Sparklin, Chicago, Ill., assignor to Birtman Electric Company, a corporation of Illinois Application December 16, 1947, Serial No. 792,084

9 Claims. (Cl. 318—325)

This invention relates to a speed governor for a motor wherein the speed of the motor may be maintained substantially constant over a wide range of speeds, and relates particularly to such a speed governor wherein the motor will be controlled so as to accelerate and decelerate smoothly when it is operating under both load and no-load conditions.

The speed governor is of the same general type as described and claimed in my copending application Serial No. 580,114, filed February 28, 1945, and now U. S. Patent Serial Number 2,532,345 of December 5, 1950. The speed governor described therein employed only one pair of contact points that were adapted to be arranged in series with the field of a motor in order to control the flow of electric current through the field. Although this speed governor having a single pair of contacts is very efficient mechanically for controlling the speed over an extremely wide range, it was found that the operation of the motor was somewhat jerky. This was caused by surges of magnetic impulses in the motor immediately after the contact points were closed. When the motor is subjected to full power by closing of the contacts, there is rapid acceleration until the speed of the motor increases to the point where the contact points are opened. When the contacts are opened, there is an immediate cutting off of power which results in a dropping off in speed. These factors combine to cause somewhat irregular and jerky operation in the motor. Although this is not harmful from a mechanical standpoint and does not decrease the efficiency of the motor and the speed governor, it does have a bad effect psychologically upon the operator of the motor. This bad psychological effect is particularly noticeable when the motor and speed governor are used with no loading on the motor such as occurs when demonstrating the motor and speed governor alone.

I have discovered that the jerky operation may be substantially reduced and in some cases eliminated by employing two pairs of contacts for governing the speed of the motor with one pair being slightly out of time phase with the other in its operation. When the motor starts operating and accelerates one pair of contacts opens first. This places either additional windings or a resistance in series with the motor field so as to "cushion" or slow down the acceleration. As the other contacts are closed, current continues to flow through the motor until the speed reaches a point where the other contacts open to limit the speed to this value. When the speed begins to drop, the other contacts close so that the resistance or windings are in the circuit and thus slows the deceleration. If the speed falls still more the one set of contacts close to short out the windings or resistance. When the motor is operating under no load the second or other pair of contacts will ordinarily govern the operation of the motor after the maximum speed has been reached. When the motor is operated under load, however, the deceleration will ordinarily be so fast that both pairs of contacts will be used in the manner explained above.

I have also discovered that the jerkiness in the motor is different when there is no load on the motor than what it is when there is a load on the motor. This is caused because a loaded motor naturally accelerates slower. In order to provide for both conditions of operation, I have provided an apparatus wherein as the unloaded motor increases in speed a relatively large resistance or additional windings is placed in series with the motor field so that the acceleration will be relatively slow. When the motor is loaded, as when it is used to drive a jig saw or the like, the resistance is reduced to a much smaller value as the load itself will serve to decrease the acceleration of the motor.

Figure 2:
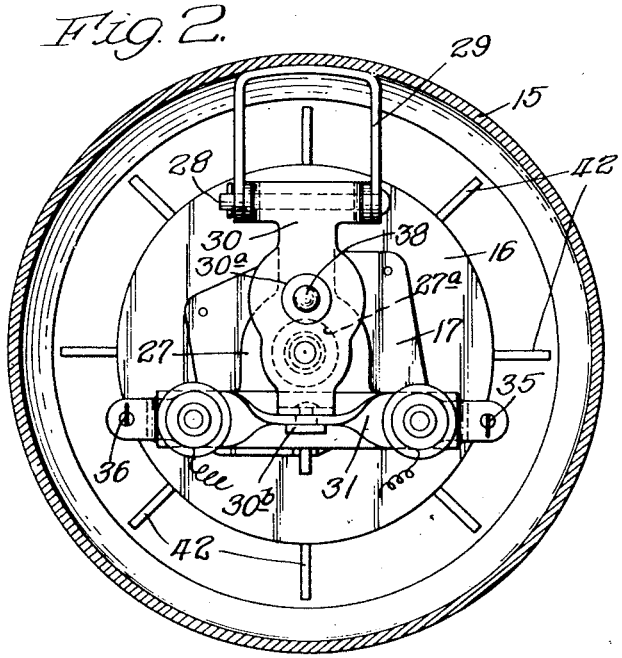
Figure 3:
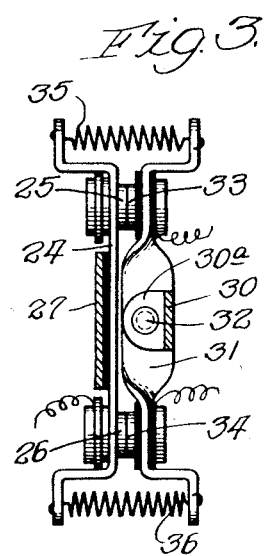

The invention will be described as related to the embodiment shown in the accompanying drawings. Of the drawings: Fig. 1 is a partial elevation partially in section of a motor having a speed governor attached thereto with the speed governor being constructed according to the principles of this invention; Fig. 2 is a section taken along line 2—2 of Fig. 1; Fig. 3 is a section taken along line 3—3 of Fig. 1; Fig. 4 is a section taken along line 4—4 of Fig. 1; Fig. 5 is an end elevation of the structure shown in Fig. 4; Fig. 6 is a section taken along line 6—6 of Fig. 1; Fig. 7 is a wiring diagram of one embodiment of the invention; and Fig. 8 is a wiring diagram of another embodiment of the invention.

In the apparatus shown in Figs. 1 to 6, inclusive, there is provided a motor 10 having a motor shaft 11 and a casing 12 arranged around the motor. The motor shaft 11 extends through an end wall 13 of the motor casing and is supported therein by a bearing 14. The motor shaft 11 extends through said wall 13 into a compartment formed by a casing 15 around the speed governor portion of the apparatus.

The speed governor comprises a relatively large flat plate 16 mounted on the shaft 11 within the casing 15 and arranged at substantially right angles to the shaft and fastened thereto, a second smaller plate 17 also fastened on the shaft 11 but parallel to and closely adjacent the first plate 16, a pair of arms 18 mounted between the plates 16 and 17 with each arm being mounted to rotate about a fulcrum 18a at one end thereof so as to be forced outwardly by centrifugal forces, a pair of first bell cranks 19 also mounted between the plates 16 and 17 with each being rotatable about a fulcrum 19a and a pair of second bell cranks 20 mounted on the smaller plate 17 at substantially right angles thereto. The arms 18 are mounted substantially diametrically opposite each other and each arm is adapted to contact one end 19b of the first bell crank 19. The other end 19c of each bell crank 19 extends to a position at least partially between the two plates 16 and 17. Each of the second bell cranks 20 are mounted between upstanding portions 21 provided on the smaller plate 17 and one end of each second bell crank is adapted to be located adjacent and to be contacted by the inside surface of the end 19c of the first bell crank 19. The other end of the second bell crank extends toward the shaft 11. The smaller plate 17 is provided with an annular upstanding inner rim 17a that is substantially concentric with the shaft 11 and which serves to reinforce the plate 17. This inner rim 17a is formed by extensions of the upstanding portions 21, as shown in Figs. 1 and 4. The two plates 16 and 17 are held in spaced apart relationship by means of spaced posts 22 extending between the two plates.

There is provided a thimble 23 slidably mounted on the end of the shaft 11 and keyed thereto so as to rotate with the shaft 11. The inner end of the thimble 23 is provided with an annular rim portion 23a that is adapted to be contacted by the inner ends of the second bell cranks 20.

When the motor 10 is operating, the increasing speed of the motor tends to force the arms 18 outwardly due to centrifugal forces set up in these arms. The outward movement of these arms causes rotation of the first bell cranks 19 about their fulcrums 19a. As the ends 19b of the bell cranks 19 are moved outwardly, the opposite ends 19c are moved inwardly. These ends 19c contacting the second bell cranks 20 cause rotation thereof and thus result in movement of the inner ends of the second bell cranks 20 toward the outer end of the motor shaft 11. These ends of the second bell cranks 20 contact the rim 23a of the thimble 23 and move the thimble outwardly. The outward movement of the thimble 23 is used to open the motor circuit and thus stop the acceleration of the motor.

In order to cause the outward movement of the thimble 23 to break electrical circuit to the motor, there is provided a contact arm 24 having two spaced apart contact points 25 and 26 mounted thereon and insulated therefrom. This contact arm 24 is mounted on one end of a base member 27 with the other end thereof being rotatably mounted about a pin 28 held by a bracket 29 attached to an inner surface of the casing 15. Also rotatably mounted about the pin 28 is a second arm 30 arranged substantially parallel to the base member 27. This second arm 30 extends down to a point adjacent the midpoint on the first arm 24. The lower end 30a of this second arm is turned inwardly toward the first arm 24 and has a third arm 31 mounted thereon by means of a pivot 32. The ends of the third arms 31 are twisted substantially ninety degrees, as shown in Fig. 3, so that these ends are substantially parallel to the first arm 24. These parallel ends are provided with two contact points 33 and 34 mounted thereon and insulated therefrom. One point 33 is arranged to contact one point 25 on the first arm 24 and the other point 34 is similarly arranged to contact the other point 26 on the first arm 24.

The extreme ends of the first 24 and second 31 arms are spaced outwardly from each other, as shown in Fig. 3. These ends, which are adjacent the one pair of contacts 25 and 33, are provided with a coil tension spring 35 extending therebetween. The other pair of cooperating points 26 and 34 are provided with a similar spring 36 of slightly greater strength.

The thimble 23 is arranged to extend through an opening 27a provided in the base member 27 and contact a button 37 mounted on the second arm 30, as shown in Fig. 1. In order that the position of the pairs of contact points relative to the end of the shaft 11 may be varied to vary the operating speed of the motor, there is provided a post 38 mounted on the base member 27 and extending through an opening 30b in the second arm 30. The outer end of the post is adapted to bear against a rotatable cam member 39 having a substantially circular cam surface 39a thereon. The cam member 39 is mounted on a shaft 40 which extends through the end of the casing 15 with the outer end of the shaft being provided with a knurled knob 41 for turning the shaft 40 and thereby rotating the cam member 39. As the outer end of the post 38 engages the cam surface 39a, the turning of the cam member 39 varies the position of the contact points relative to the end of the shaft. As the thimble 23 is forced outwardly by increases in speed of the motor, the particular speed desired can be regulated by selecting the desired position of the contact points relative to the end of the shaft. This operation is described in greater detail in my aforementioned copending application Serial No. 580,114.

In order to provide for ventilation of the motor and speed governor, spaced openings 13a are arranged in the end wall of the motor casing 12. Located adjacent these openings are spaced radial fan blades 42 mounted on the back surface of the relatively large rotatable plate 16.

In order to cushion the acceleration and deceleration of the motor and to reduce jerky operation there is provided in the embodiment shown in Fig. 7 additional windings 43 in series with the field 44 of the series motor with these windings being shown as located between the field windings and the armature 50 of the motor. This additional winding may be placed in the motor and is preferably of a smaller wire than the wires of the field 44 so that the bulk of the additional winding may be reduced as much as possible. This winding is tapped as indicated at 45 with the major portion of the resistance being on the end of the resistance winding that is most remote from the armature 50. There is provided a manually operable switch 46 between the tapped portion 45 and the end of the winding 43 that is adjacent the field coils 44.

As shown in Fig. 7, one lead 48 from a source of electric current is connected to the contact point 26. The other contact point 34 of this pair of contacts is connected to the end of the field coil 44 opposite the windings 43. The other electric lead 49 is connected to the end of the armature 50 opposite the windings 43. The contact point 25 is connected to the point 51 where the other side of the armature is attached to the end of the windings 43. The other contact point 33 of this pair is connected to the point 52 where windings 43, field coil 44 and switch 46 are connected.

When the motor is being used under no-load or under an extremely light load, the manually operable switch 46 is left open as shown in Fig. 7. This utilizes the entire windings 43 in the circuit. When the motor is thus operating under no-load conditions, the contacts 25 and 33 which are provided with the light spring 35 will open first and place the windings 43 in the motor circuit. These windings serve to reduce the acceleration of the motor. As soon as the speed of the motor has become sufficient, the contact points 26 and 34 will control the operation of the motor. This is true because when the motor is under no-load it will operate at substantially constant speed determined by the setting of the speed governor, and the speed will thus not become low enough for the contacts 25 and 33 to close. As most of the windings 43 are shorted out on the circuit by the manual switch 46, the acceleration of the motor will be cushioned by that portion of the windings between the point 45 and the point 51 (Fig. 7).

When the motor is being operated under load such as when used to operate a jig saw or other type of equipment, the manual switch is normally closed. This shorts out most of the winding 43 and thereby uses only a very small part thereof. This small winding is sufficient as the load itself tends to slow down the acceleration of the motor when the electric current is turned on. As the speed of the loaded motor increases to a point near the speed at which the governor is set, the resistance below the tap 45 is employed to cushion the acceleration of the motor. When the speed of the motor reaches the speed at which the governor is set, contacts 25 and 33 open, thereby placing the winding below the tap 45 in series with the motor field and letting contacts 26 and 34 control the operation of the motor. When the contacts 26 and 34 open by increasing speed of the motor, all current is shut off from the motor. The speed thereupon immediately drops and contacts 26 and 34, controlled by the heavy spring 36, immediately close. If the load on the motor is very heavy, the speed will tend to further decrease until the motor can again pick up speed. If this further decrease is sufficient, the contacts 25 and 33 that are controlled by the light spring 35 then close to short the windings out of the motor field. Thus, with this arrangement acceleration and deceleration is cushioned so that the motor will operate with relatively little noise and vibration.

Even if the manual switch 46 is left open when the motor is loaded, the operation of the motor will be just as efficient as if it were closed. The only noticeable difference will be a greater noise and vibration. Likewise, the manual switch 46 may be left closed when the motor is operating under no load, if desired, without decreasing the efficiency of the motor even though the noise and vibration will be somewhat more noticeable.

In a typical embodiment of the invention wherein a series motor is used for operating on a 115 volt current, the resistance winding 43 has a total value of 35 ohms. The tapped point 45 is arranged to divide the resistance element into a 25 ohm portion and a 5 ohm portion. The 25 ohm portion is that portion adapted to be by-passed by the switch 46 while the 5 ohm portion is between the tap 45 and the adjacent field coil 44. This provides a motor that is smooth and quiet in operation.

The springs 35 and 36, which are used to resist the opening of the contact points, may be any strength desired. In one embodiment, the spring 35 which is the relatively light one has a resistance of 5.9 ounces. The other spring 36, which is relatively heavy, has a resistance of 6.1 ounces. There is thus a difference of 0.2 ounce which causes the pairs of cooperating contact points to open and close out of time phase with each other.

The circuit shown in Fig. 8 employs a resistance 60 to cushion the acceleration and deceleration of the motor. In this arrangement one end 61 of the resistance unit 60 at the contact point 25 is attached to a lead 62 that is attachable to a source of electric current. The other end 63 of the resistance unit 60 is attached to the contact point 26. The contact points 33 and 34 are attached to each other and to one end of the field coil 44. The other end of the field coil on the other side of the armature is attachable to a source of electric current through the lead 64. The major portion of the resistance element 60 is adapted to be shorted out of the circuit by a manually operable switch 65. This switch is attached between the end 61 of the resistance element and a tap 66 thereon.

When the motor is intended to operate on no-load, the manual switch 65 is left open, as shown in Fig. 8. As soon as the motor is attached to a source of electric power through the leads 62 and 64 the motor begins to accelerate. As the contact points 25 and 33, and 26 and 34, are closed, the resistance element 60 is shorted out of the circuit by the contacts 25 and 33. When the speed of the motor reaches a certain value below the maximum, the contacts 25 and 33, which are controlled by a weak spring, open. This immediately places the resistance element 60 in series with the motor and reduces the rate of acceleration, thereby serving to "cushion" the acceleration. The speed continues to increase until the maximum speed is reached. At this point the contacts 26 and 34 open. As the motor is under no load, the speed will remain substantially constant, so that the contact points 25 and 33 will remain open and the speed will be controlled by the contact points 34 and 26.

When the motor is to be operated under load, such as in operating a jig saw or the like, the manual switch 65 will ordinarily be closed. The closing of this switch serves to remove a major portion of the resistance element from the circuit, so that only the portion of the resistance element between the tap 66 and the adjacent end 63 of the element is used.

When the motor is attached to a source of electric current through the leads 62 and 64, the motor begins to accelerate. As was pointed out in relation to the circuit in Fig. 7, the contacts 25 and 33 which are closed short out the resistance element. As soon as the speed reaches a particular value, the contacts 25 and 33 open. This places the resistance in the circuit, so that the acceleration is slowed down or cushioned. As soon as the maximum speed is obtained the contacts 26 and 34 open to limit the speed to this particular value which is dependent upon the setting of the speed governor. As the motor is under load, the speed drops rapidly as soon as the contacts 26 and 34 are opened. During this deceleration of the motor the contacts 26 and 34 close first, so that the resistance element is again placed in the circuit. Because of the load on the motor the speed will continue to drop until the contacts 25 and 33 close. As soon as these contacts close the resistance is shorted out of the circuit, so that the motor operates on the full field coil 44. Thus, that portion of the resistance element 60 that is not shorted out by the manual switch 65 serves to cushion both the acceleration and the deceleration of the motor. This is caused by arranging the contact points 25 and 33 to open first and close last. The other contact points 26 and 34 open last and close first.

The resistance that is placed in series with the motor may be an ordinary resistance element, as shown in Fig. 8. Additional windings may be used, preferably around the field coils, to serve the same purpose. These windings should extend in the same direction as the windings of the coils. These additional windings, which preferably are of a relatively small wire, reduce the speed by increasing the lines of force in the motor. The term "impedance" used in the claims is intended to include either a resistance element, additional windings on the field of a motor, or any other element that has this impeding effect. This impedance, when placed in series with the field of the motor, serves to reduce the power output of the motor for any given torque.

In the speed control apparatus shown and described herein the power output for a given torque is reduced when the speed of the motor increases beyond a predetermined rate. In the particular embodiment shown in the drawings and described in the specification, the opening of the contacts 25 and 33 achieves this result by placing an impedance in the motor circuit, although it is believed obvious that any other means could be used. In this instance the predetermined rate is the speed at which the contacts 25 and 33 are opened. This speed may, of course, be varied by varying the position of the arms 27 and 30 by means of the control knob 41.

Having described my invention as related to the embodiment set out in the accompanying drawings, it is my intention that the invention be not limited by any of the details of description, but rather be construed broadly within its spirit and scope as set out in the accompanying claims.

I claim:

1. In a speed governor for a motor including a member movable with respect to a portion of the motor and means for moving the member with the distance of movement being dependent upon the speed of the motor: a pair of normally contacting but separable contact points movable with respect to a portion of the motor, a second pair of normally contacting but separable contact points similarly movable with respect to the motor, means operatively connecting the movable member with one point of each pair of points to cause separation of the pairs of points when the motor speed exceeds a predetermined maximum that is dependent upon the location of the pairs of points, means independently resisting separation of one pair of points, second means of stronger resistance independently resisting separation of the other pair of points, said other pair of points being arranged in the electrical circuit of the motor in series with the field thereof, and an impedance in series with said other pair of points and with said field, said one pair of points being connected across said impedance.

2. The speed governor of claim 1 wherein there is provided a manually operable cut-off switch across a portion only of the impedance.

3. In a speed governor for a motor including a member movable with respect to a portion of the motor and means for moving the member with the distance of movement being dependent upon the speed of the motor: a movable contact arm, two spaced apart contact points mounted on said arm and insulated therefrom, a movable second arm adjacent the first arm, both said arms being mounted for movement as a unit and movable toward and away from each other, a third arm rotatably mounted on said second arm, two spaced apart contact points mounted on the third arm and insulated therefrom, each of said points being arranged to contact one of the points on the first arm to provide two pairs of contact points, and each being movable toward and away from its first arm point by rotation of the third arm, said movable member being arranged to contact the second arm and cause separation of the pairs of points when the motor speed exceeds a predetermined maximum that is dependent upon the location of the arms, means resisting separation of one pair of points, second means of stronger resistance resisting separation of the other pair of points, said other pair of points being arranged in the electrical circuit of the motor in series with the field thereof, and an impedance in series with said other pair of points and with said field, said one pair of points being connected across said impedance.

4. The speed governor of claim 3 wherein each resisting means comprises a coil spring extending between the second arm and the third arm in the region adjacent the corresponding pair of points.

5. The speed governor of claim 3 wherein there is provided a manually operable cut-off switch across a portion of the impedance.

6. The speed governor of claim 3 wherein the impedance has a total resistance of about 30 ohms and there is provided a manually operable cut-off switch across a portion of the resistance element equivalent to about 25 ohms.

7. The speed governor of claim 3 wherein the resisting means of one pair of points is a spring of about 5.9 ounces resistance, and the resisting means of the other pair of points is a spring of about 6.1 ounces resistance.

8. In a speed governor for a motor including a member movable with respect to a portion of the motor and means for moving the member with the distance of movement being dependent upon the speed of the motor, two pairs of contact points movable with respect to a portion of the motor, means operatively connecting the movable member with one point of each pair of points to cause separation of the two pairs of contact points when the motor speed exceeds a predetermined maximum that is dependent upon the location of the pairs of points relative to the motor, one pair of points being arranged to open slightly before the other as the speed of the motor increases toward the predetermined maximum, an impedance arranged to be placed in series with the motor circuit upon opening of said one pair of contacts, and means for reducing the value of the impedance when the motor is changed from no-load to load operation.

9. In a speed governor for a motor including a member movable with respect to a portion of the motor and means for moving the member with the distance of movement being dependent upon the speed of the motor; a movable contact arm, two spaced apart contact points mounted on said arm and insulated therefrom, a movable second arm adjacent the first arm, both said arms being mounted for movement as a unit and movable toward and away from each other, a third arm rotatably mounted on said second arm, two spaced apart contact points mounted on the third arm and insulated therefrom, each of said points being arranged to contact one of the points on the first arm to provide two pairs of contact points, and each being movable toward and away from its first arm point by rotation of the third arm, said movable member being arranged to contact the second arm and cause separation of the pairs of points when the motor speed exceeds a predetermined maximum that is dependent upon the location of the arms, means resisting separation of one pair of points, second means of stronger resistance resisting separation of the other pair of points, and means operated by the opening of said one pair of points for reducing the power output of the motor for a given torque.

CHARLES H. SPARKLIN.

REFERENCES CITED

The following references are of record in the file of this patent:

UNITED STATES PATENTS

| Number | Name | Date |
|--------|------|------|
| 685,852 | Kragh | Nov. 5, 1901 |
| 1,334,868 | Laycock | Mar. 23, 1920 |
| 2,220,306 | Warner | Nov. 5, 1940 |
| 2,246,803 | Lee | June 24, 1941 |